United States Patent [19]
Jen

[11] Patent Number: 6,099,852
[45] Date of Patent: Aug. 8, 2000

[54] WETTABLE SILICONE-BASED LENSES

[75] Inventor: James J. Jen, Jacksonville, Fla.

[73] Assignee: Johnson & Johnson Vision Products, Inc., Jacksonville, Fla.

[21] Appl. No.: 09/159,034

[22] Filed: Sep. 23, 1998

[51] Int. Cl.⁷ .............................. A61K 9/00; G02C 7/02; G02C 7/04; B05D 5/00
[52] U.S. Cl. ............ 424/429; 351/159; 351/160 H; 424/422; 424/484; 427/2.1; 427/2.24; 427/164; 427/412.1
[58] Field of Search .................. 427/387, 164, 427/2.24, 2.1, 412.1; 424/484, 422, 429; 523/106; 525/937; 351/160 H, 159

[56] References Cited

U.S. PATENT DOCUMENTS

| | | |
|---|---|---|
| 3,008,920 | 11/1961 | Urchick . |
| 3,070,573 | 12/1962 | Beck . |
| 3,854,982 | 12/1974 | Aelion et al. . |
| 3,916,033 | 10/1975 | Merrill . |
| 3,925,178 | 12/1975 | Gesser et al. . |
| 4,311,573 | 1/1982 | Mayhan et al. . |
| 4,332,922 | 6/1982 | Kossmehl et al. . |
| 4,589,964 | 5/1986 | Mayhan et al. . |
| 4,611,892 | 9/1986 | Kawashima et al. ................ 427/412.1 |
| 4,711,943 | 12/1987 | Harvey, III ............................. 526/279 |
| 4,731,080 | 3/1988 | Galin . |
| 4,892,402 | 1/1990 | Sawamoto et al. . |
| 5,075,133 | 12/1991 | Hosono et al. ......................... 427/164 |
| 5,263,992 | 11/1993 | Guire . |
| 5,429,839 | 7/1995 | Graiver et al. .......................... 427/155 |
| 5,453,467 | 9/1995 | Bamford et al. ....................... 427/2.24 |
| 5,792,331 | 8/1998 | Srinivasan et al. .................. 427/407.2 |
| 5,804,318 | 9/1998 | Pinchuk et al. ......................... 427/337 |
| 5,922,161 | 7/1999 | Wu et al. ............................... 427/2.11 |
| 5,936,703 | 8/1999 | Miyazaki et al. .................. 351/160 R |

OTHER PUBLICATIONS

Plueddemann, E.P., "Mechanism of Adhesion through Silane Coupling Agents", Interfaces in Polymer Matrix Composites, vol. 6, 1974, pp. 173–217 (no month).

*Primary Examiner*—Diana Dudash
*Attorney, Agent, or Firm*—Lois Gianneschi

[57] ABSTRACT

This invention provide silicone-based, biomedical devices that exhibit improved wettability as well as biocompatability through the use of functional silane agents. More specifically, the invention provides devices at least one surface of which has a functional silane coupling agent and hydrophilic polymer.

29 Claims, No Drawings

WETTABLE SILICONE-BASED LENSES

FIELD OF THE INVENTION

This invention relates to silicone-based, biomedical devices. In particular, the invention provides silicone-based, biomedical devices, such as contact lenses, that exhibit improved wettability as well as biocompatability.

BACKGROUND OF THE INVENTION

Devices for use in and on the human body are well known. The chemical composition of the surfaces of such devices plays a pivotal role in dictating the overall efficacy of the devices. For example, many devices, including catheters, stents, and implants require biologically non-fouling surfaces, meaning that proteins, lipids, and cells will not adhere to the surface. In some cases, materials for these devices are developed that are ideal in terms of strength, optimal transmission, flexibility and the like, but that foul when in use. In these cases, either new materials must be developed or an attempt to alter the surface characteristics of the materials must be made.

In the case of ophthalmic lenses, particularly contact lenses, many materials possess the desired oxygen permeability, mechanical and optical properties, yet are subject to rapid fouling. Additionally, the surface energies of the materials may be so low that the lenses are not sufficiently hydrophilic, meaning that they are not wettable by tear fluid. Contact lenses made of these materials can be uncomfortable to wear and may become tightly adhered to the cornea causing the potential for serious damage to the corneal epithelium.

A number of methods have been used to modify devices to improve their surface properties. For example, it is known to modify contact lenses made of silicone rubber polymers by grafting hydrophilic polymers onto the contact lens surface. However, such methods are disadvantageous in that they produce lenses with surfaces that are rough, uneven, or have pin-holes.

U.S. Pat. No. 4,332,922 discloses the conversion of silicone rubber lens surfaces to an oligomeric siloxane containing SiH groups and subsequently converting the SiH groups to SiOH groups or reacting the groups with C=C containing compounds to make the surface hydrophilic. However, the chemistry of this solution is limited.

Various methods using plasma techniques to coat hydrophobic substrates are known. However, all such plasma methods require that the substrates be exposed to vacuum, which is inconvenient and, at times, impracticable. Thus, a need exists for processes for modifying surface properties that overcome some of the disadvantages of the known processes.

DETAILED DESCRIPTION OF THE INVENTION AND PREFERRED EMBODIMENTS

The present invention provides wettable silicone polymer-based, biomedical devices. In one embodiment, the invention provides a method for manufacturing biomedical devices comprising, consisting essentially of, and consisting of contacting at least one surface of a silicone-polymer based biomedical device with a reactive effective amount of one or more functional silane coupling agents and a coating effective amount of one or more hydrophilic polymers. In another embodiment, the invention provides biomedical devices comprising, consisting essentially of, and consisting of a biomedical device at least one surface of the device having a reactive effective amount of one or more functional silane coupling agents and a coating effective amount of one or more hydrophilic polymers.

By "biomedical device" is meant any device designed to be used while in or on either or both human tissue or fluid. Examples of such devices include, without limitation, stents, implants, catheters, and ophthalmic lenses. In a preferred embodiment, the biomedical device is an ophthalmic lens including, without limitation, contact or intraocular lenses. More preferably, the device is a contact lens. In a preferred embodiment, the invention comprises, consists essentially of, and consists of silicone polymer-based contact lenses, and methods for their manufacture, at least one surface of the lenses having reactive effective amounts of one or more functional silane coupling agents and coating effective amounts of one or more hydrophilic polymers.

By "silicone polymer-based" is meant a device partially or completely made of silicone or silicone-containing polymers. Exemplary of such polymers, without limitation, are silicones, silicone mixed blends, silicone hydrogels, polyurethane-silicone hydrogels, and the like. Illustrative silicones include, without limitation: polydimethyl siloxane, polydimethyl-covinylmethylsiloxane, and silicone rubbers as described in U.S. Pat. No. 3,228,741; silicone blends as described in U.S. Pat. No. 3,341,490; and silicone compositions as described in U.S. Pat. No. 3,518,324, which are incorporated in their entireties herein by reference.

Useful silicone materials include, without limitation, crosslinked polysiloxanes obtained by crosslinking siloxane prepolymers. Particularly suitable materials include, without limitation, organopolvsiloxane polymer mixtures that readily undergo hydrosilylation, which prepolymers will contain vinyl radicals and hydride radicals and are of the general formulation of polydihydrocarbyl-co-vinylhydrocarbylsiloxane and polydihydrocarbyl-cohydrocarbylhydrogensiloxanes in which the hydrocarbyl radicals are monovalent hydrocarbon radicals including without limitation, $C_1$ —$C_7$ radicals, aryl radicals including without limitation phenyl, tolyl, xylyl, and biphenyl, haloaryls, including, without limitation chlorophenyl and cycloalkyl radicals, and the like. More preferred materials are silicone hydrogels, particularly silicone hydrogels formed from monomer mixtures containing an acrylic-capped polysiloxane prepolymer, a bulky polysiloxanylalkyl (meth)acrylate monomer and hydrophilic monomers as described in U.S. Pat. Nos. 5,387,632, 5,358,995, 5,023,305, 5,034,461, 4,954,586, 4,780,515, and 4,343,927, which are incorporated in their entireties herein by reference. Specific examples include, without limitation, trimethylsilylmethyl (meth)acrylate, pentamethyldisiloxyethyl (meth)acrylate, tris(trimethylsiloxy)silylpropyl (meth)acrylate, methyldi(trimethylsiloxy)methyldisiloxanylpropyl (meth)acrylate, tert-butyltetramethyldisiloxanylethyl (meth)acrylate, and the like.

One ordinarily skilled in the art will recognize that the formulation for producing the surface to be coated may contain other monomers and additives. For example, ultraviolet absorbing monomers, reactive tints, processing aids, and the like may be used.

By "functional silane coupling agent" is meant any known silane coupling agent. Preferred silane coupling agents are of the formula $X_3Si(CH_2)_nY$ wherein n is 0–3 and preferably n=3, X is a hydrolyzable group, preferably Cl, $CH_3O$- or $C_2H_5$-, and Y is an organofunctional group. The specific Y group will be readily determinable by one ordinarily skilled in the art by considering the type of hydrophilic polymer coating to be applied to the surface. For example, a vinyl Y group may be used when the coating desired is a vinyl polymer. Exemplary organofunctional groups include, without limitation, acrylic, amino, chloro, epoxy, glycidoxy, mercapto, methacryloxy, vinyl and the like.

Illustrative functional silane coupling agents include, without limitation, vinyl benzyl cationic silane, vinyl-tris( β-methoxyethoxy)silane, vinyltriacetoxysilane, γ-methacryloxypropyltrimethoxysilane, γ-aminopropyltriethoxysilane, γ-(β-aminoethyl) aminopropyl trimnethoxysilane, γ-glycidoxypropyltrimethoxysilane, γ-mercaptopropyltrimethoxysilane, β-(3,4-epoxycyclohexyl)-ethyltrimethoxysilane, γ-chloropropyltrimethoxysilane, and mixtures thereof. The silane coupling agents typically are commercially available.

It is believed, without wishing to be bound by this theory, that the coupling agent, when contacted with the silicone polymer based surface, reacts with the surface to form siloxane bonds. Thus, the reactive end of the coupling agent becomes chemically anchored to the surface and available for bonding with the hydrophilic polymer coating desired.

In the device of the invention, at least one surface contains a reactive effective amount of one or more functional silane coupling agents. A reactive effective amount is an amount of the coupling agent sufficient to convert the chemically inactive surface to a reactive surface capable of being coated with the desired hydrophilic polymer coating.

To form the devices of the invention, the coupling agent is contacted with the device surface. Temperature and pressure at which the contacting is performed are not critical. The coupling agent may be contacted with the surface in the form of a solution of the coupling agent with water. Alternatively, a solution of the coupling agent and an alcohol, such as methanol, ethanol or propanol, or organic solvents such as benzene, toluene, hexane, and the like may be used. Generally, a solution of about 1 to about 15 weight percent, preferably about 2 to about 5 percent, based on the total weight of the solution is used. Depending on the coupling agent selected, use of an acid or base catalyst may be desirable.

Preferably, prior to contacting the surface with the coupling agent, the surface is treated by any convenient means to expose sites for bonding of the silicone end of the coupling agent. For example, the surface may be treated by acid or alkaline etching or plasma, or combinations thereof.

Any of a wide variety of methods may be used for contacting the surface and the coupling agent. For example, the surface may be immersed in the coupling agent solution or the solution may be dropped onto the surface. As another alternative, contacting may take place by coating the surface of a mold with the coupling agent. The silicone pre-polymer is then added to the mold by any known means, such as by injection, and polymerized.

Still another alternative for contacting is to blend the coupling agent with the silicone pre-polymer that will form the device. After curing, a portion of the organofunctional groups of the coupling agent will be on the device surface and available for reacting with the polymer coating.

As yet another alternative for contacting, the coupling agent may be pre-blended with the polymer coating. The polymer coating is then applied to the device surface and polymerized.

It will be recognized that different coupling agents may be used on different surfaces of the device permitting coating of these surfaces with various polymers. For example, a vinyl silane coupling agent may be applied to the front surface along with a hydroxyethyl methacrylate coating while an amino silane coupling agent is applied to the back surface along with a polyethylene glycol coating.

Further, it will be recognized that other coupling agents may be used in addition to the functional silane coupling agents. Suitable coupling agents include, without limitation, titanate coupling agents.

The desired hydrophilic polymer used to coat the device surface may be formed from the suitable monomer. For example, the hydrophilic polymer coating may be formed from monomers including, without limitation, acrylics, methacrylics, hydroxyethyl acrylates, hydroxyethyl methacrylates, acrylamides, methacrylamides, N,N-dimethylacrylamide, N-vinylpyrrolidone, dimethylaminomethyl- and dimethylaminoethyl acrylates and methacrylates, hydroxypropyl acrylates and methacrylates, glycerol acrylates and methacrylates, diethylene glycol monoacrylates and monomethacrylates, triethylene glycol monoacrylates and methacrylates, vinyl alcohols, ethylene oxides, propylene oxides, mixtures thereof, and the like. Preferably, the hydrophilic polymer coating is formed form a hydroxyethyl (meth)acrylate, (meth)acrylamide, N,N-dimethylacrylamide, N-vinylpyrrolidone, ethylene glycol, ethylene oxide, vinyl alcohol, acrylic acid, ethyleneoxide bisacetic acid, or mixtures thereof.

The polymer and/or monomer may be coated onto the device surface using any convenient method. For example, a solution of a monomer in a water or organic solvent may be applied to the lens after which the monomer is polymerized by any known method. A coating effective amount is used which is an amount sufficient to impart the desired level of hydrophilicity to the coated surface. Typically, the monomer and/or polymer concentration used is about 0.1 to about 15 weight percent, preferably about 1 to about 10 weight percent, based on the total weight of the solution. Alternatively, the monomer and/or polymer may be used without water or an organic solvent.

Although the invention may find its greatest utility in providing wettable surfaces, it will be recognized by one ordinarily skilled in the art that the invention may be used to apply any number of coatings to the device surface.

The invention will be clarified further by a consideration of the following, non-limiting examples.

EXAMPLES

Examples 1–5

Silicone lenses made of polydimethylsilicone ("PDMS") were surface treated with a 5 v/v percent, aqueous solution of γ-aminopropyltriethoxysilane and then coated with ETAFILCON® A monomer mix. After a 10 min ultra-violet cure, a polyhydroxyethyl methacrylate coating was obtained. Dynamic contact angles of coated and uncoated lenses and films were measured and the results are shown on Table 1.

TABLE 1

|  | Advancing Angle (degrees) | Standard Deviation |
|---|---|---|
| PDMS Lens (lens substrate) | 118 | 9 |
| Etafilcon A Coated PDMS Lens | 72 | 21 |

TABLE 1-continued

|  | Advancing Angle (degrees) | Standard Deviation |
|---|---|---|
| PDMS Film (film substrate) | 115 | 4 |
| Etafilcon A Coated PDMS Film | 89 | 5 |
| ACUVUE ™ Lens | 81 | 10 |

The results show that the functional silane coupling agent-treated lenses and films exhibit good wettability.

EXAMPLES 6–7

Contact lenses made of a combination of silicone and fluoro polymer were surface treated with a 5 v/v percent solution of γ-aminopropyltriethoxysilane in methanol and then coated with a 0.1 w/w percent polyoxyethyleneoxide bis(acetic acid) aqueous solution. Dynamic contact angles of coated and uncoated lenses were measured and the results shown on Table 2. The results show that the coated surfaces exhibit good wettability.

TABLE 2

|  | Advancing Angle (°) | Standard Deviation |
|---|---|---|
| Uncoated Lens Substrate | 111 | 10 |
| Coated Lens | 80 | 16 |

What is claimed is:

1. A device comprising a biomedical device at least one surface of the device having a reactive effective amount of one or more functional silane coupling agents and a coating effective amount of one or more hydrophilic polymers.

2. The device of claim 1 wherein the biomedical device is an ophthalmic lens.

3. The device of claim 1 wherein the ophthalmic lens is a contact lens.

4. The device of claim 1 wherein the functional silane coupling agent is of the formula $X_3(Si)CH_2)_nY$ wherein n is 0 to 3, X is Cl, $CH_3O$- or $C_2H_5O$- and Y is an organofunctional group.

5. The device of claim 1 wherein the organofunctional group of the coupling agent is acrylic, amino, chloro, epoxy, glycidoxy, mercapto, methacryloxy, or vinyl.

6. The device of claim 1 wherein the coupling agent is vinyl benzyl cationic silane, vinyl-tris(P-methoxyethoxy) silane, vinyltriacetoxysilane, γ-methacryloxypropyltrimethoxysilane, γ-aminopropyltriethoxysilane, γ-(β-aminoethyl) aminopropyl trimethoxysilane, γ-glycidoxypropyltrimethoxysilane, γ-mercaptopropyltrimethoxysilane, β-(3,4-epoxycyclohexyl)-ethyltrimethoxysilane, γ-chloropropyltrimethoxysilane, or mixtures thereof.

7. The device of claim 1 wherein the coupling agent is γ-aminopropyltriethoxysilane.

8. The device of claim 1 wherein the one or more hydrophilic polymers is a hydroxyethyl (meth)acrylate polymer, (meth)acrylamide polymer, N,N-dimethylacrylamide polymer, N-vinylpyrrolidone polymer, polyethylene glycol, polyethylene oxide, polyvinyl alcohol, polyacrylic acid, polyethyleneoxide bisacetic acid, or mixture thereof.

9. The device of claim 1 wherein the hydrophilic polymer is polyhydroxyethyl methacrylate.

10. The device of claim 1 wherein the hydrophilic polymer is polyethyleneoxide.

11. A device comprising a contact lens at least one surface of the lens having a reactive effective amount of one or more functional silane coupling agents of the formula $X_3(Si)CH_2)_nY$ wherein n is 0 to 3, X is Cl, $CH_3O$- or $C_2H_5O$- and Y is an organofunctional group selected from the group consisting of acrylic, amino, chloro, epoxy, glycidoxy, mercapto, methacryloxy, and vinyl and a coating effective amount of one or more hydrophilic polymers.

12. The device of claim 11 wherein the coupling agent is vinyl benzyl cationic silane, vinyl-tris(13-methoxyethoxy) silane, vinyltriacetoxysilane, γ-methacryloxypropyltrimethoxysilane, γ-aminopropyltriethoxysilane, γ-(β-aminoethyl) aminopropyl trimethoxysilane, γ-glycidoxypropyltrimethoxysilane, γ-mercaptopropyltrimethoxysilane β-(3,4-epoxycyclohexyl)-ethyltrimethoxysilane, γ-chloropropyltrimethoxysilane, or mixtures thereof.

13. The device of claim 12 wherein the coupling agent is γ-aminopropyltriethoxysilane.

14. The device of claim 11 wherein the one or more hydrophilic polymers is polyhydroxyethyl (meth)acrylate, poly(meth)acrylamide, poly N,N-dimethylacrylarnide, poly N-vinylpyrrolidone, polyethylene glycol, polyethylene oxide, polyvinyl alcohol, polyacrylic acid, polyethyleneoxide bisacetic acid, or mixtures thereof.

15. The device of claim 14 wherein the hydrophilic polymer is polyhydroxyethyl methacrylate.

16. The device of claim 14 wherein the hydrophilic polymer is polyethyleneoxide.

17. A device comprising a contact lens at least one surface of the lens having a reactive effective amount of one or more functional silane coupling agents selected from the group consisting of vinyl benzyl cationic silane, vinyl-tris(β-methoxyethoxy)silane, vinyltriacetoxysilane, γ-methacryloxypropyltrimethoxysilane, γ-aminopropyltriethoxysilane, γ-(β-aminoethyl) aminopropyl trimethoxysilane, γ-glycidoxypropyltrimethoxysilane, γ-mercaptopropyltrimethoxysilane, β-(3,4-epoxycyclohexyl)-ethyltrimethoxysilane, γ-chloropropyltrimethoxysilane, and mixtures thereof, and a coating effective amount of one or more hydrophilic polymers selected from the group consisting of hydroxyethyl (meth)acrylate, (meth)acrylamide, N,N-dimethylacrylamide, N-vinylpyrrolidone, polyethylene glycol, polyethylene oxide, polyvinyl alcohol, polyacrylic acid, polyethyleneoxide bisacetic acid, and mixtures thereof.

18. The device of claim 17 wherein the coupling agent is γ-aminopropyltriethoxysilane.

19. The device of claim 17 wherein the hydrophilic polymer is polyhydroxyethyl methacrylate.

20. The device of claim 17 wherein the hydrophilic polymer is a polyethyleneoxide.

21. The lens of claim 17 wherein the coupling agent is γ-aminopropyltriethoxysilane and the hydrophilic polymer is polyhydroxyethyl methacrylate.

22. A method for manufacturing biomedical devices comprising the steps of contacting at least one surface of a silicone-polymer based biomedical device with a reactive effective amount of one or more functional silane coupling agents and subsequently coating the contacted surface with a coating effective amount of one or more hydrophilic polymers.

23. The method of claim 22 wherein the biomedical device is an ophthalmic lens.

24. The method of claim 23 wherein the ophthalmic lens is a contact lens.

25. The method of claim 22 wherein the functional silane coupling agent is of the formula $X_3(Si)CH_2)_nY$ wherein n is 0 to 3, X is Cl, $CH_3O$- or $C_2H_5O$- and Y is an organofunctional group.

26. The method of claim 25 wherein the organofunctional group of the coupling agent is acrylic, amino, chloro, epoxy, glycidoxy, mercapto, methacryloxy, or vinyl.

27. The method of claim 25 wherein the coupling agent is vinyl benzyl cationic silane, vinyl-tris(β-methoxyethoxy) silane, vinyltriacetoxysilane, γ-methacryloxypropyltrimethoxysilane, γ-aminopropyltriethoxysilane, γ-(P-aminoethyl) aminopropyl trimethoxysilane, γ-glycidoxypropyltrimethoxysilane, γ-mercaptopropyltrimethoxysilane, β-(3,4-epoxycyclohexyl)-ethyltrimethoxysilane, γ-chloropropyltrimethoxysilane, or mixtures thereof.

28. The method of claim 27 wherein the coupling agent is γ-aminopropyltriethoxysilane.

29. The method of claim 22 wherein the one or more hydrophilic polymers is a hydroxyethyl (meth)acrylate polymer, (meth)acrylamide polymer, N,N-dimethylacrylamide polymer, N-vinylpyrrolidone polymer, polyethylene glycol, polyethylene oxide, polyvinyl alcohol, polyacrylic acid, polyethyleneoxide bisacetic acid, or mixture thereof.

* * * * *